(12) United States Patent
Kitayama et al.

(10) Patent No.: US 11,215,705 B2
(45) Date of Patent: Jan. 4, 2022

(54) RADAR DEVICE

(71) Applicant: HITACHI AUTOMOTIVE SYSTEMS, LTD., Hitachinaka (JP)

(72) Inventors: Akira Kitayama, Hitachinaka (JP); Hiroshi Kuroda, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 329 days.

(21) Appl. No.: 16/487,561

(22) PCT Filed: Mar. 16, 2018

(86) PCT No.: PCT/JP2018/010417
§ 371 (c)(1),
(2) Date: Aug. 21, 2019

(87) PCT Pub. No.: WO2018/180584
PCT Pub. Date: Oct. 4, 2018

(65) Prior Publication Data
US 2019/0377077 A1    Dec. 12, 2019

(30) Foreign Application Priority Data
Mar. 30, 2017  (JP) .............................. JP2017-067876

(51) Int. Cl.
*G01S 13/34* (2006.01)
*G01S 13/931* (2020.01)
*G08G 1/16* (2006.01)

(52) U.S. Cl.
CPC ............ *G01S 13/34* (2013.01); *G01S 13/931* (2013.01); *G08G 1/16* (2013.01)

(58) Field of Classification Search
CPC ........ G01S 7/023; G01S 7/2813; G01S 13/34; G01S 13/343; G01S 13/345; G01S 13/931
See application file for complete search history.

(56) References Cited

U.S. PATENT DOCUMENTS 5,280,288 A * 1/1994 Sherry ................... G01S 7/354
                                                     342/83
5,497,162 A * 3/1996 Kaiser .................... G01S 7/023
                                                     342/147

(Continued)

FOREIGN PATENT DOCUMENTS

EP    1 840 595 A2   10/2007
JP    H05-027012 A    2/1993

(Continued)

OTHER PUBLICATIONS

International Search Report with English translation and Written Opinion issued in corresponding application No. PCT/JP2018/010417 dated Jul. 10, 2018.

(Continued)

*Primary Examiner* — Peter M Bythrow
(74) *Attorney, Agent, or Firm* — Foley & Lardner LLP

(57) ABSTRACT

The present invention realizes stable operation of a radar device even if there is radio wave interference between multiple radar devices. A radar device 108 is provided with the following: an oscillator 105 that generates a modulated signal that has undergone frequency modulation; a transmission unit 103 that emits a transmission signal that has undergone frequency modulation during a prescribed modulation operation period using the modulated signal generated by the oscillator 105; a reception unit 104 that receives a reception signal which is the transmission signal that has been reflected off of an object in the area; and a signal processing unit 106. The signal processing unit 106 is provided with: an object information calculation unit that calculates information of an object on the basis of the reception signal; an interference state analysis unit that measures a surrounding radio wave interference state, from a prescribed minimum frequency Fmin to a maximum frequency Fmax, during a search modulation operation (Continued)

period that does not overlap the modulation operation period; and a band selection unit that selects a frequency band of the transmission signal on the basis of the radio wave interference state measured by the interference state analysis unit.

13 Claims, 15 Drawing Sheets

(56) References Cited

U.S. PATENT DOCUMENTS

| | | | | |
|---|---|---|---|---|
| 6,894,641 | B2* | 5/2005 | Uehara | G01S 7/023 342/104 |
| 7,522,092 | B2* | 4/2009 | Okai | G01S 13/931 342/70 |
| 7,605,745 | B2* | 10/2009 | Honda | G01S 7/36 342/70 |
| 7,728,762 | B2* | 6/2010 | Sakamoto | G01S 13/345 342/70 |
| 8,125,375 | B2* | 2/2012 | Nakanishi | G01S 7/023 342/159 |
| 8,471,760 | B2* | 6/2013 | Szajnowski | G01S 7/0232 342/70 |
| 9,645,230 | B2* | 5/2017 | Shirakawa | G01S 7/023 |
| 9,689,967 | B1* | 6/2017 | Stark | H04B 17/309 |
| 9,720,072 | B2* | 8/2017 | McCloskey | G01S 7/0232 |
| 9,952,311 | B2* | 4/2018 | Kojima | G01S 7/023 |
| 10,514,442 | B2* | 12/2019 | Lim | H04L 5/0062 |
| 10,746,848 | B2* | 8/2020 | Katayama | G01S 7/0235 |
| 2007/0188373 | A1* | 8/2007 | Shirakawa | G01S 13/24 342/70 |
| 2007/0200747 | A1* | 8/2007 | Okai | G01S 13/222 342/70 |
| 2008/0106458 | A1* | 5/2008 | Honda | G01S 13/931 342/59 |
| 2008/0122680 | A1* | 5/2008 | Morinaga | G01S 13/584 342/109 |
| 2009/0028097 | A1* | 1/2009 | Patel | H04W 16/14 370/329 |
| 2013/0257643 | A1* | 10/2013 | Inomata | G01S 7/023 342/70 |
| 2016/0124075 | A1* | 5/2016 | Vogt | G01S 13/343 342/13 |
| 2017/0153315 | A1* | 6/2017 | Katayama | G01S 7/0235 |

FOREIGN PATENT DOCUMENTS

| | | |
|---|---|---|
| JP | 2000-206227 A | 7/2000 |
| JP | 2002-168947 A | 6/2002 |
| JP | 2004-163340 A | 6/2004 |
| JP | 2007-232498 A | 9/2007 |
| JP | 2010-025944 A | 2/2010 |
| JP | 2012-088238 A | 5/2012 |
| JP | 2013-160585 A | 8/2013 |
| JP | 2015-224899 A | 12/2015 |

OTHER PUBLICATIONS

Extended European Search Report issued in corresponding European Patent Application No. 18777277.7 dated Nov. 26, 2020.

Office Action issued in corresponding Japanese Patent Application No. 2019-509278 dated Apr. 28, 2020, with English machine translation.

* cited by examiner (a)

(b)

RADAR DEVICE

TECHNICAL FIELD

The present invention relates to a radar device.

BACKGROUND ART

In the related art, radar devices mounted on a vehicle to detect objects such as an obstacle in the surroundings are known for use in automatic driving of a vehicle and a driving assistance system. Such a radar device generally modulates a radio wave in a frequency band having excellent linearity such as millimeter wave bands (77 GHz, 79 GHz) and a quasi-millimeter wave band (24 GHz) by a modulation system such as frequency modulated continuous wave (FMCW) modulation and multi-frequency CW modulation and emits the modulated radio wave. Then a reflection wave of the emitted radio wave from a surrounding object is received and subjected to signal processing, and thereby calculation of the relative distance, velocity, and direction (angle) of the surrounding object with respect to the radar device is performed. In this signal processing, the received reflection wave is subjected to fast Fourier transform (FFT) processing to be decomposed into frequency components, and in a case where a peak value of the spectrum is larger than or equal to a prescribed signal to noise ratio (SNR), it is detected as a surrounding object. Therefore, it is necessary to reduce the noise level to increase the signal strength in order to improve the detection rate and to suppress false detection.

Meanwhile, with the spread of radar devices mounted on vehicles in the future, radio wave interference from other vehicles is expected to increase. That is, a radar device for vehicles is highly likely to receive not only the original reception signal but also a reflection wave, which is a radio wave emitted from a radar device of another vehicle and reflected by a surrounding object, or to directly receive a radio wave emitted from a radar device of another vehicle. In particular, in a case where the host vehicle is traveling closely in parallel with or behind another vehicle or when a large number of vehicles are densely populated within a range of a few meters due to traffic congestion, or the like, there is a high probability of receiving radio wave interference from other vehicles.

It is known that the noise level of an FFT processing result generally increases due to occurrence of disturbance in a received waveform in a case where a radar device using a modulation system such as FMCW modulation or multi-frequency CW modulation undergoes radio wave interference from another radar device using a similar modulation system. In the case where a modulation waveform of the radar device of the other vehicle is similar to a modulation waveform of the radar device of the host vehicle, not only the noise level increases, but it is also conceivable that a reception signal from the radar device of the other vehicle may be erroneously recognized as a surrounding object.

Therefore, techniques for avoiding such a situation have been devised. PTL 1 discloses a technique of an in-vehicle radar device that changes a frequency used for transmission waves to another frequency when radio wave interference is detected.

CITATION LIST

Patent Literature

PTL 1: JP 2015-224899 A

SUMMARY OF INVENTION

Technical Problem

In the technique disclosed in PTL 1, a prescribed frequency or a randomly selected frequency is used as the frequency of transmission waves after the change. Therefore, in a situation where a large number of radar devices having different frequencies are present around the host vehicle, radio wave interference may occur even at a frequency after the change. Since the frequency change is repeated in such a case, stable operation of the radar device cannot be achieved.

Solution to Problem

A radar device according to the present invention includes: an oscillation unit which generates a frequency-modulated modulation signal; a transmission unit which emits a transmission signal frequency-modulated during a prescribed modulation operation period using the modulation signal; a reception unit which receives a reception signal which is the transmission signal reflected by a surrounding object; an object information calculation unit which calculates information of the object on the basis of the reception signal; an interference state analysis unit which measures a surrounding radio wave interference state in a range between a prescribed minimum frequency and a maximum frequency during a search modulation operation period which does not overlap with the modulation operation period; and a band selection unit which selects a frequency band of the transmission signal on the basis of the radio wave interference state measured by the interference state analysis unit.

Advantageous Effects of Invention

The present invention implements stable operation of a radar device even when there is radio wave interference among a large number of radar devices.

DESCRIPTION OF EMBODIMENTS

Hereinafter, embodiments of the present invention will be described with reference to the drawings.

First Embodiment

Figure 1:
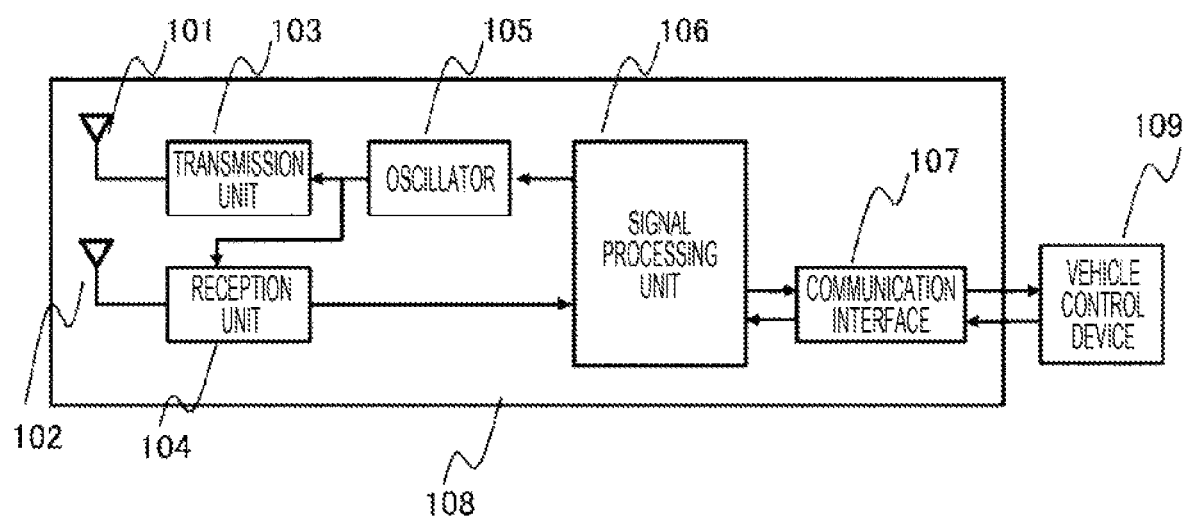
FIG. 1 is a diagram illustrating a configuration of a radar device according to an embodiment of the present invention.

FIG. 1 is a diagram illustrating a configuration of a radar device 108 according to an embodiment of the present invention. The radar device 108 is mounted on a vehicle such as an automobile to detect an object around the vehicle and is used to measure a radio wave interference state around the vehicle. The radar device 108 includes a transmission antenna 101, a reception antenna 102, a transmission unit 103, a reception unit 104, an oscillator 105, a signal processing unit 106, and a communication interface 107. The radar device 108 is connected to a vehicle control device 109 provided in the vehicle.

The oscillator 105 generates a frequency-modulated modulation signal and supplies the modulation signal to the transmission unit 103 and the reception unit 104. As the oscillator 105, for example, a phase locked loop (PLL) including a voltage controlled oscillator (VCO), a multiplier, and the like is used. The frequency of the modulation signal output from the oscillator 105 or a frequency obtained by dividing the frequency of the modulation signal by a prescribed ratio is controlled (modulated) by the signal processing unit 106. Note that the oscillator 105 generates a modulation signal by different methods for detecting an object around the vehicle and for measuring a radio wave interference state around the vehicle. This point will be described later in detail.

For detection of an object around the vehicle, the transmission unit 103 outputs a frequency-modulated transmission signal to the transmission antenna 101 by power-amplifying the modulation signal from the oscillator 105. This transmission signal is emitted via the transmission antenna 101 as a radio wave directed to the surroundings of the vehicle, for example, ahead of the vehicle. Hereinafter, a period during which a frequency-modulated transmission signal is emitted from the transmission antenna 101 is referred to as a "modulation operation period." Note that the transmission unit 103 does not emit a transmission signal when measuring a radio wave interference state around the vehicle. At this time, the operation of the transmission unit 103 may be halted, or the oscillator 105 may not output the modulation signal to the transmission unit 103.

For detection of an object around the vehicle, the reception unit 104 receives a signal obtained when the transmission signal emitted from the transmission unit 103 via the transmission antenna 101 during the modulation operation period is reflected by an object around the vehicle and input to the reception antenna 102. Hereinafter, a signal received by the reception unit 104 in response to a transmission signal from the transmission unit 103 in the above manner is referred to as a "reception signal." Then, the reception signal is mixed with the modulation signal from the oscillator 105, and a beat signal corresponding to the frequency difference of these signals is generated to perform frequency down conversion. The beat signal generated by the reception unit 104 is input to the signal processing unit 106 after unnecessary frequencies are cut off through a band limiting filter (not illustrated).

For detection of an object around the vehicle, the signal processing unit 106 causes the oscillator 105 to generate the modulation signal for the transmission unit 103 to emit a transmission signal during the modulation operation period. Then, digital data obtained by AD-converting the beat signal from the reception unit 104 is input, and signal processing for detecting an object around the vehicle is performed on the basis of the digital data. Hereinafter, a period during which the signal processing unit 106 performs such signal processing is referred to as a "signal processing period."

Meanwhile, for measurement of a radio wave interference state around the vehicle, the signal processing unit 106 causes the oscillator 105 to generate a modulation signal for measuring a radio wave interference state around the vehicle and searching for a frequency band having less interference by a method different from the modulation signal used by the transmission unit 103 to emit the transmission signal. Then, the radio wave interference state around the vehicle is measured on the basis of a signal received by the reception unit 104 using this modulation signal, and a frequency band of a subsequent transmission signal is selected. At this time, the reception unit 104 mixes the signal input via the reception antenna 102 with the modulation signal from the oscillator 105 like when receiving a reception signal to generate a beat signal corresponding to the frequency difference between these signals, and outputs the beat signal to the signal processing unit 106 through the band limiting filter (not illustrated). The signal processing unit 106 receives input of digital data obtained by AD-converting the beat signal from the reception unit 104 and performs signal processing for measurement of a radio wave interference state and selection of a frequency band on the basis of the digital data. Hereinafter, a modulation signal generated by the oscillator 105 at this time is referred to as a "search modulation signal," and a signal received by the reception unit 104 is referred to as a "search reception signal." A period during which the oscillator 105 generates a search modulation signal is referred to as a "search modulation operation period," and a period during which the signal processing unit 106 performs the above signal processing is referred to as a "frequency search processing period."

In the radar device 108, a set of the modulation operation period, the signal processing period, the search modulation operation period, and the frequency search processing period (hereinafter, referred to as a "frame") is repeated at constant periods. Note that the modulation operation period and the signal processing period may be separate periods which do not overlap each other in the same frame, or may overlap partially or entirely. Likewise, the search modulation operation period and the frequency search processing period as well as the signal processing period and the search modulation operation period may be separate periods which do not overlap each other in the same frame, or may overlap partially or entirely. Furthermore, the frequency search processing period and the modulation operation period may overlap partially or entirely over two consecutive frames. As long as the modulation operation period and the search modulation operation period do not overlap, the above periods can be set in any manner.

The communication interface 107 performs interface processing of communication signals input or output between the radar device 108 and the vehicle control device 109. The interface processing performed by the communication interface 107 allows a signal processing result of the signal processing unit 106 to be transmitted to the vehicle control device 109 and various types of control data transmitted from the vehicle control device 109 to be input to the signal processing unit 106.

Figure 2:
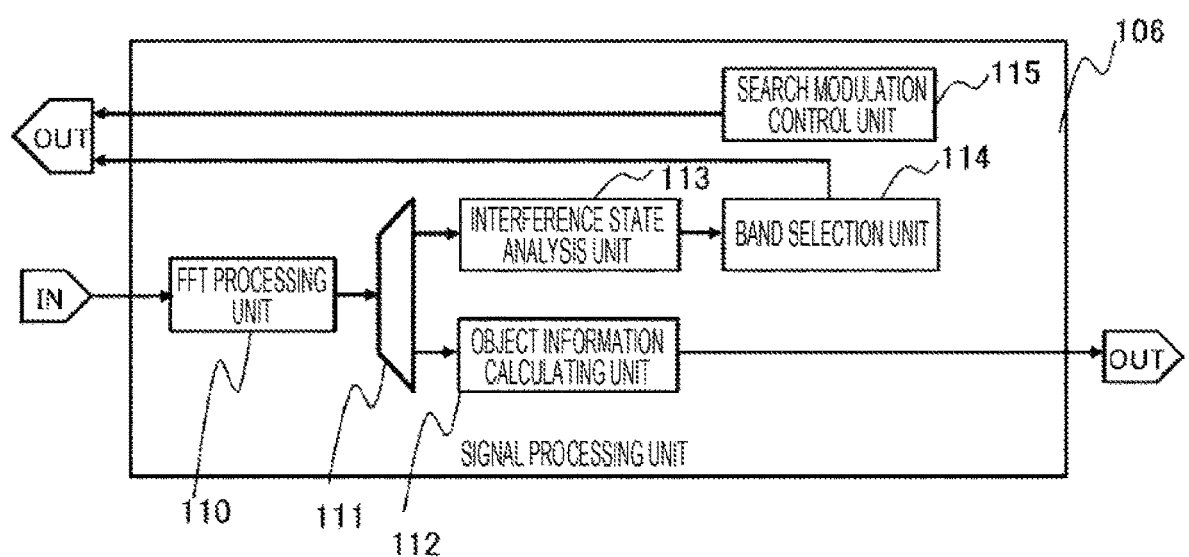
FIG. 2 is a diagram illustrating a functional configuration of a signal processing unit according to an embodiment of the present invention.

FIG. 2 is a diagram illustrating a functional configuration of the signal processing unit 106 according to an embodiment of the present invention. The signal processing unit 106 includes an FFT processing unit 110, a demultiplexer 111, an object information calculation unit 112, an interference state analysis unit 113, a band selection unit 114, and a search modulation control unit 115 as its functions. The signal processing unit 106 includes, for example, a CPU, a ROM, a RAM, and the like, and implements these functions by executing a program stored in the ROM by the CPU. Note that the respective functions of the signal processing unit 106 may be implemented by hardware such as an FPGA.

The FFT processing unit 110 receives input of the digital data of the beat signal output from the reception unit 104 and AD converted. The FFT processing unit 110 performs fast Fourier transform (FFT) on the basis of the digital data of the input beat signal to obtain a signal waveform in which the beat signal is decomposed into frequency components. Information of the signal waveform obtained by the FFT processing unit 110, that is, spectrum information of the reception signal or the search reception signal is output to the object information calculation unit 112 or the interference state analysis unit 113 via the demultiplexer 111.

The demultiplexer 111 switches an output destination of signal strength information for each frequency component obtained by the FFT processing unit 110 depending on the operation state of the signal processing unit 106. Specifically, in the signal processing period during which the signal processing unit 106 performs signal processing for detection of an object around the vehicle, an output destination of the demultiplexer 111 is switched such that spectrum information of the reception signal obtained by the FFT processing unit 110 is output to the object information calculation unit 112. Meanwhile, in the frequency search processing period during which the signal processing unit 106 measures a radio wave interference state around the vehicle and performs processing for searching for a frequency band with less interference, an output destination of the demultiplexer 111 is switched such that spectrum information of the search reception signal obtained by the FFT processing unit 110 is output the interference state analysis unit 113.

The object information calculation unit 112 detects an object around the vehicle on the basis of the spectrum information of the reception signal output from the FFT processing unit 110 and calculates object information. Specifically, the frequency of a signal representing an object around the vehicle is identified from the spectrum information of the reception signal, and angle estimation processing, tracking processing, etc. are performed to calculate object information representing the relative distance, velocity, angle, and the like of the object with respect to the radar device 108. The object information calculated by the object information calculation unit 112 is transmitted to the vehicle control device 109 via the communication interface 107.

The interference state analysis unit 113 measures the radio wave interference state around the vehicle on the basis of the spectrum information of the search reception signal output from the FFT processing unit 110. Specifically, the radio wave interference state around the vehicle is measured by measuring the noise level of the search reception signal for each prescribed frequency band on the basis of the spectrum information of the search reception signal. The measurement result of the radio wave interference state by the interference state analysis unit 113 is output to the band selection unit 114.

The band selection unit 114 selects the frequency band of the transmission signal on the basis of the measurement result of the radio wave interference state output from the interference state analysis unit 113. Specifically, a frequency band with a small noise level in the measurement result of the radio wave interference state is searched as a frequency band with less interference, and the frequency band is selected as the frequency band of a subsequent transmission signal. Then, a control signal corresponding to the selected frequency band is output to the oscillator 105 to be used for frequency control of a modulation signal in modulation operation periods in the subsequent frames.

The search modulation control unit 115 controls the oscillator 105 in the search modulation operation period. Specifically, the oscillator 105 is controlled to generate a search modulation signal by output of a control signal corresponding to a prescribed search modulation signal to the oscillator 105 during the search modulation operation period. The search modulation signal is a modulation signal obtained by a frequency sweep between a prescribed minimum frequency and a maximum frequency within a frequency range available to the radar device 108, which will be described later in detail.

Note that the configuration of the radar device 108 described with reference to FIG. 1 and the functional configuration of the signal processing unit 106 described with reference to FIG. 2 are merely examples. The contents of the present invention are not limited to these configurations but are generally applicable to radar devices having other configurations. For example, a plurality of transmission antennas 101 and a plurality of reception antennas 102 may be included, and the FFT processing unit 110 may be implemented by separate hardware other than the signal processing unit 106.

Figure 3:
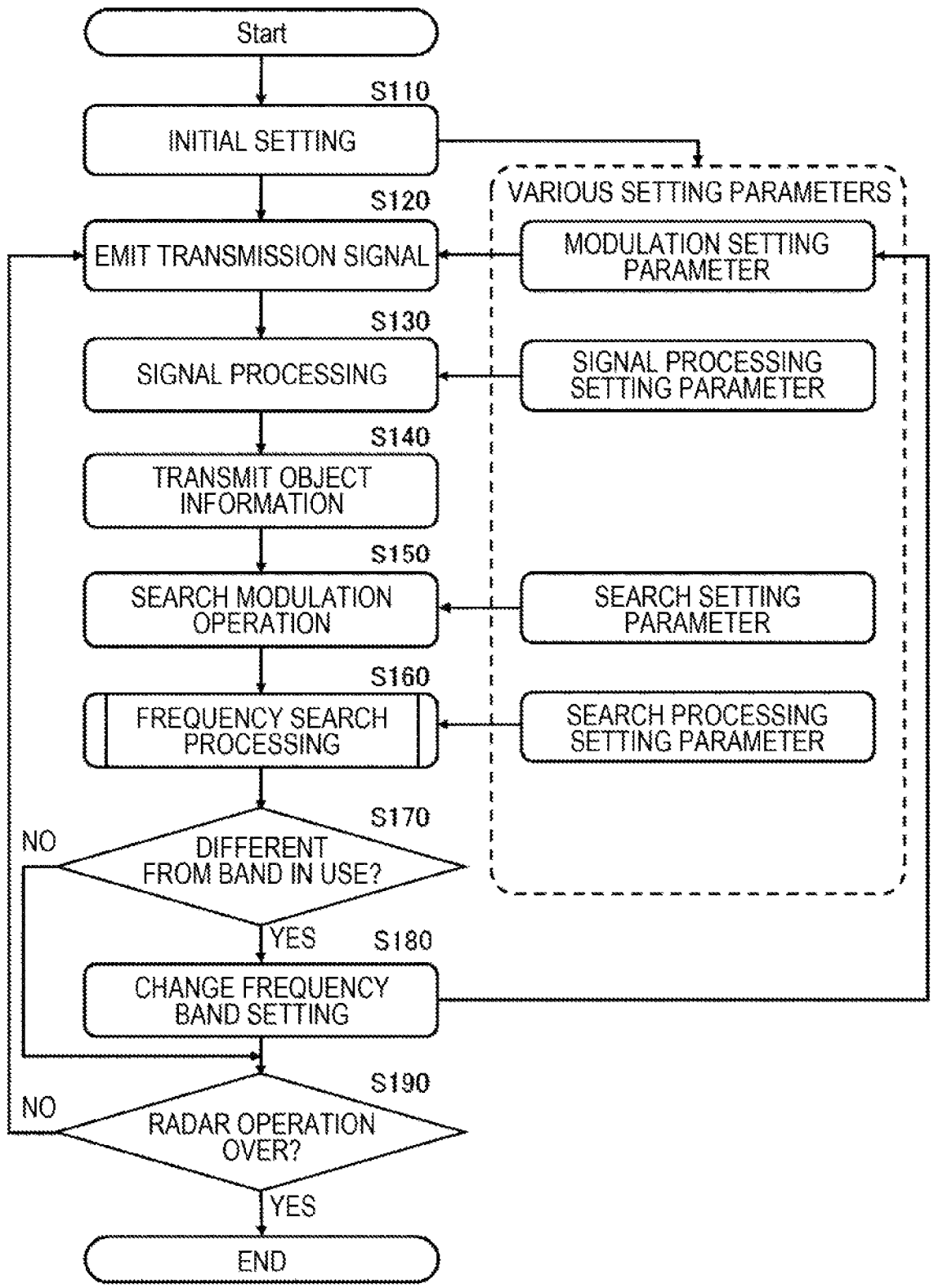
FIG. 3 is a flowchart of processing executed by the signal processing unit according to an embodiment of the present invention.

Next, details of processing performed by the signal processing unit 106 will be described. FIG. 3 is a flowchart of processing performed by the signal processing unit 106 according to an embodiment of the present invention. The signal processing unit 106 implements the processing illustrated in the flowchart of FIG. 3 by, for example, a program executed by the CPU.

In step S110, the signal processing unit 106 performs initial setting of various parameters in the radar device 108. In this example, initial values are set such as a modulation setting parameter for a modulation signal generated by the oscillator 105 in a modulation operation period, a signal processing setting parameter for signal processing executed by the signal processing unit 106 in a signal processing period, a search setting parameter for a search modulation signal generated by the oscillator 105 in a search modulation operation period, and a search processing setting parameter for signal processing performed by the signal processing unit 106 in a frequency search processing period. As for the initial values of these parameters, those previously stored in the radar device 108 may be used, or values used immediately before may be used.

In step S120, the signal processing unit 106 controls the oscillator 105 and the transmission unit 103 to emit a frequency-modulated transmission signal from the transmission antenna 101 toward the surroundings of the vehicle. At this time, the signal processing unit 106 controls the frequency of the modulation signal generated by the oscillator 105 using the modulation setting parameter initialized in step S110 and determines the frequency band of the transmission signal.

Figure 4:
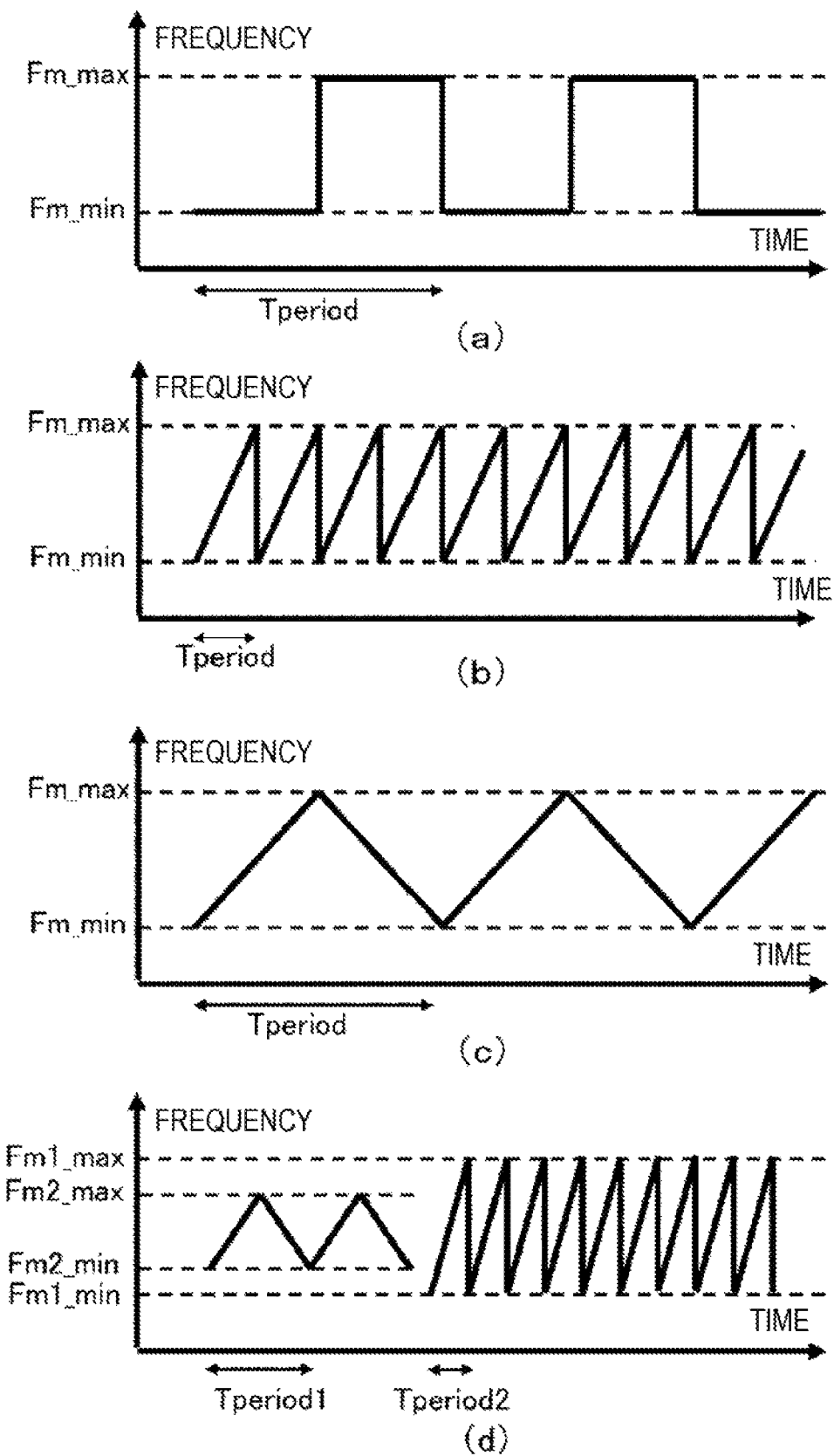
FIG. 4 includes graphs illustrating examples of a modulation signal.

FIG. 4 includes graphs illustrating examples of a modulation signal generated by the oscillator 105 in step S120 of FIG. 3. FIG. 4(*a*) is an example of two-frequency CW modulation in which a modulation signal of a frequency Fm_min and a modulation signal of a frequency Fm_max are repeatedly output at a constant period. FIGS. 4(*b*), 4(*c*), and 4(*d*) are examples of FMCW modulation in which the frequency is continuously changed within a prescribed range and the modulation signal is output.

FIG. 4(*b*) illustrates an example in which a modulation signal, the frequency of which is continuously increased from the frequency Fm_min to the frequency Fm_max, is repeatedly output at each period Tperiod. In FIG. 4(*c*) illustrates an example in which a modulation signal, the frequency of which is continuously increased from the frequency Fm_min to the frequency Fm_max and then reversely reduced continuously from the frequency Fm_max to the frequency Fm_min, is repeatedly output at each period Tperiod. FIG. 4(*d*) illustrates an example in which the waveform of the modulation signal is changed halfway. Specifically, a modulation signal, the frequency of which is continuously increased from a frequency Fm2_min to a frequency Fm2_max and then continuously reduced from the frequency Fm2_max to the frequency Fm2_min, is repeatedly output for each period Tperiod1. Then, a modulation signal, the frequency of which is continuously increased from a frequency Fm1_min to a frequency Fm1_max, is repeatedly output at each period Tperiod2.

The signal processing unit 106 causes the oscillator 105 to generate a modulation signal as illustrated in FIG. 4 by controlling the oscillator 105 on the basis of the modulation setting parameter. Note that the modulation signal is not limited to those illustrated in FIG. 4, and modulation signals of various waveforms other than these can be generated from the oscillator 105.

Returning to the explanation of FIG. 3, in step S130, the signal processing unit 106 performs signal processing for detecting an object around the vehicle using digital data of a beat signal output from the reception unit 104 in response to the reception signal which is the transmission signal emitted in step S120 and reflected by the object around the vehicle. In this example, the signal processing unit 106 first performs FFT processing in the FFT processing unit 110 to acquire spectrum information of the reception signal. Subsequently, the object information calculation unit 112 detects an object around the vehicle from the spectrum information of the reception signal using the signal processing setting parameter initialized in step S110, and calculates the relative distance, velocity, angle, and the like of the object as object information.

In step S140, the signal processing unit 106 transmits the object information calculated in step S120 to the vehicle control device 109 via the communication interface 107.

In step S150, the signal processing unit 106 performs search modulation operation of controlling the oscillator 105 to generate a search modulation signal. At this time, the signal processing unit 106 controls, by the search modulation control unit 115, the frequency of the search modulation signal generated by the oscillator 105 using the search setting parameters initialized in step S110. The search modulation signal generated accordingly by the oscillator 105 is used in the reception unit 104 for reception of the search reception signal.

Figure 5:
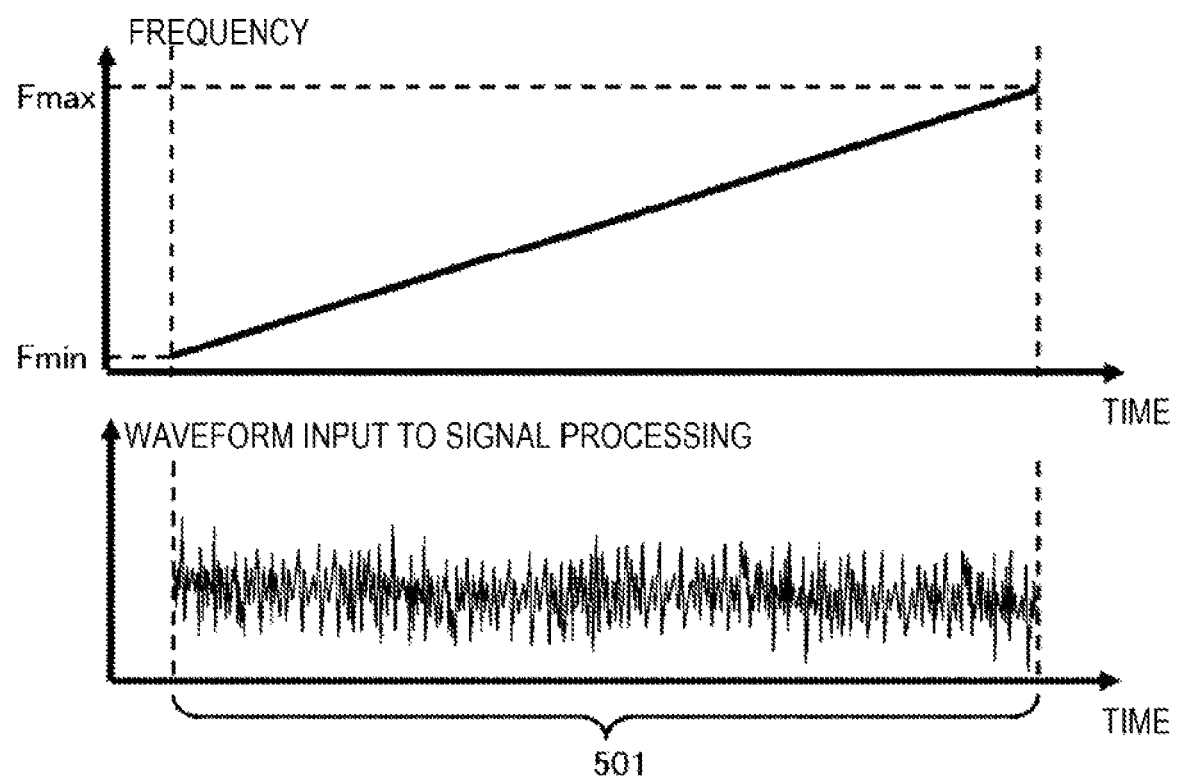
FIG. 5 includes graphs illustrating an example of a search modulation signal and a search reception signal.
Figure 6:
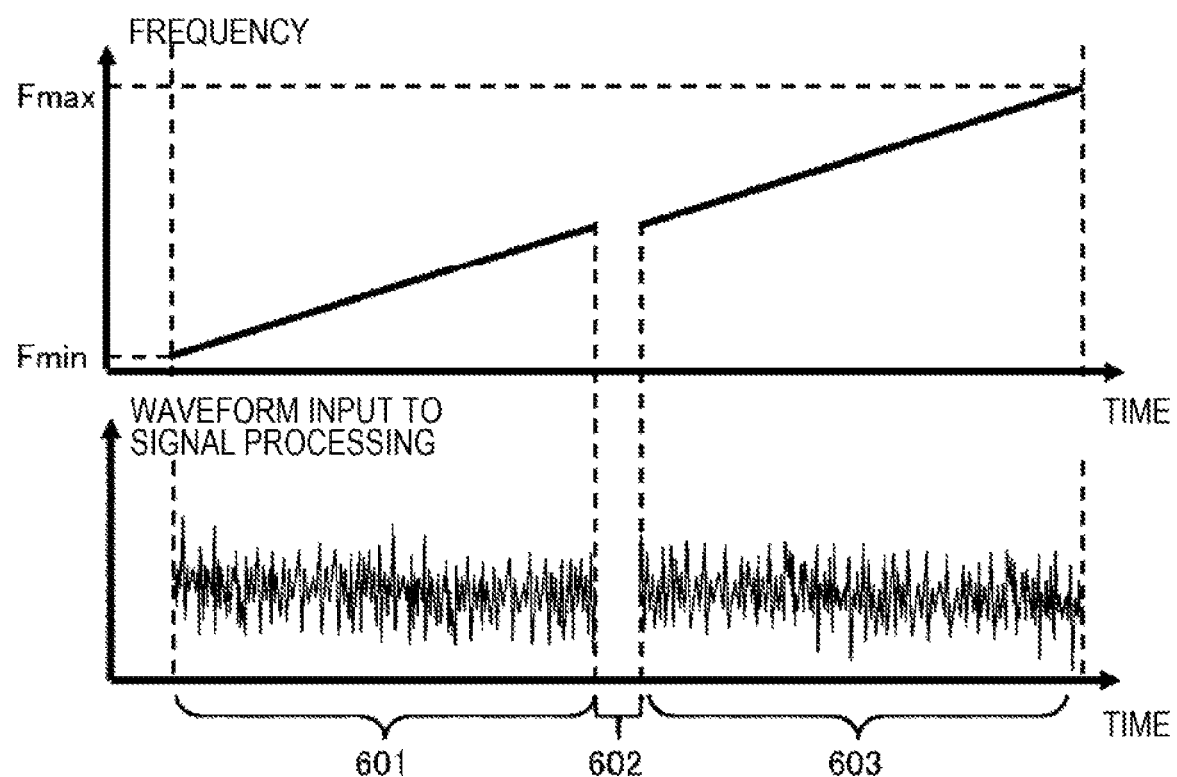
FIG. 6 includes graphs illustrating an example of a search modulation signal and a search reception signal.
Figure 7:
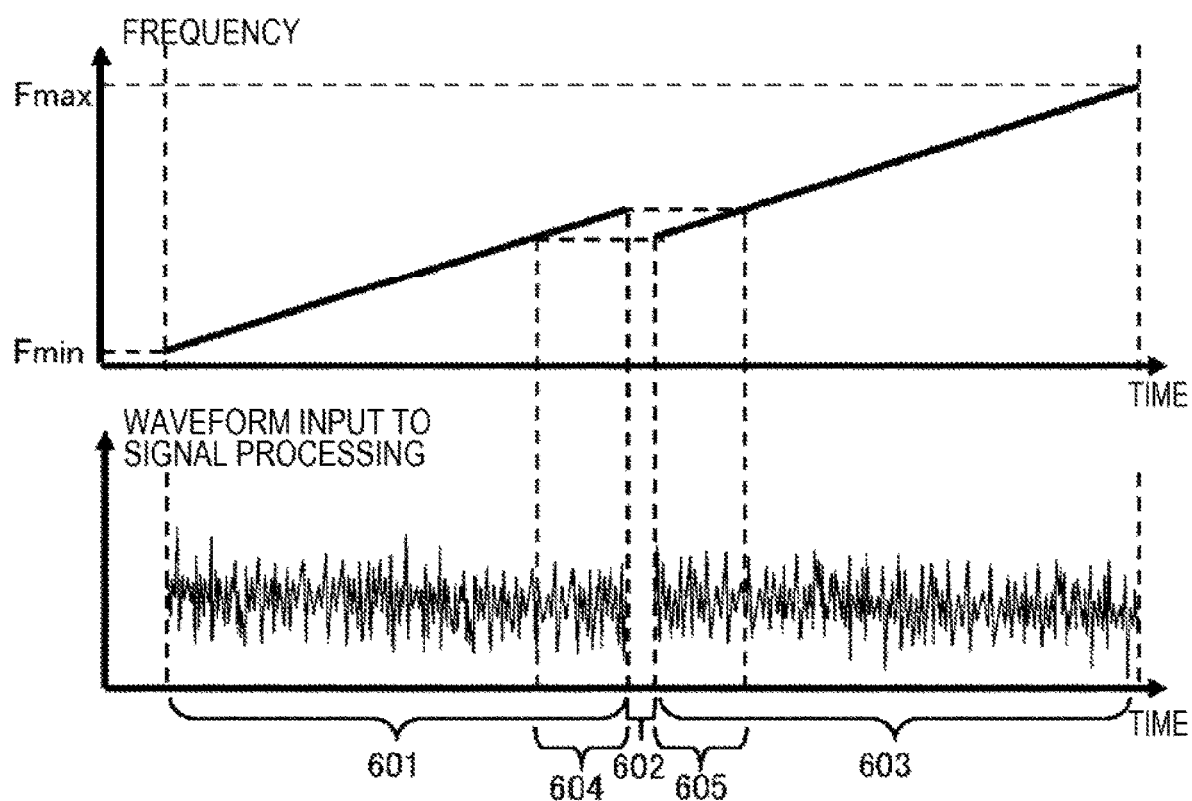
FIG. 7 includes graphs illustrating an example of a search modulation signal and a search reception signal.

FIGS. 5, 6, and 7 are graphs illustrating examples of a search modulation signal generated by the oscillator 105 in step S150 of FIG. 3 and a search reception signal received thereby. FIG. 5 illustrates an example of a search modulation signal obtained by a continuous frequency sweep between a prescribed minimum frequency Fmin and a prescribed maximum frequency Fmax and a search reception signal received on the basis of the search modulation signal. Let a period during which the search modulation signal changes from the minimum frequency Fmin to the maximum frequency Fmax at a prescribed modulation slope be a search modulation operation period 501 as illustrated in FIG. 5. In this case, a search reception signal corresponding to the search modulation signal is received by the reception unit 104 in the search modulation operation period 501 and then input to the signal processing unit 106 after being subjected to AD conversion.

The above-described minimum frequency Fmin and the maximum frequency Fmax can be selected desirably from frequency bands available to the radar device 108. For example, the lower limit value and the upper limit value of frequency bands limited by the regulations of the Radio Act or the like may be set as the minimum frequency Fmin and the maximum frequency Fmax, respectively. Alternatively, in a case where there is a limitation in terms of hardware, the minimum frequency Fmin and the maximum frequency Fmax may be set under the limitation. Moreover, the modulation slope of the search modulation signal can be desirably selected, and a negative slope may be selected. For example, in a case where the modulation slope of the modulation signal generated by the oscillator 105 is caused to coincide with the modulation slope of the search modulation signal in step S120, this is preferable since a search reception signal having a similar tendency to the noise included in the reception signal can be acquired. However, in a case where the modulation slope of the modulation signal is gentle and the search modulation operation period becomes too long when the search modulation signal is changed at the same modulation slope, the modulation slope of the search modulation signal may be sharpened to shorten the search modulation operation period.

In a case where the oscillator 105 cannot sweep at a stretch between the minimum frequency Fmin and the maximum frequency Fmax due to the performance limitation or the like of the oscillator 105, the frequency sweep may be performed in multiple stages. That is, frequency bands available to the radar device 108 may be divided into a plurality of frequency bands, and the oscillator 105 may be caused to generate a search modulation signal obtained by a frequency sweep of each of the divided frequency bands. In this case, the search modulation operation period is also divided into a plurality of portions on the basis of the sweep time of each of the frequency bands having been divided.

FIG. 6 illustrates an example of a search modulation signal obtained by a frequency sweep in two stages and a search reception signal received on the basis of the search modulation signal. In the example of FIG. 6, a frequency band change period 602 for the oscillator 105 is provided between a search modulation operation period 601 in the first half and a search modulation operation period 603 in the second half. Data of the search reception signal obtained in each of the search modulation operation periods 601 and 603 can be linked and used as continuous data when the surrounding environment does not change. Note that actually the continuity of a signal component related to an object is lost as the relative velocity between the vehicle and the surrounding object increases; however, it can be deemed that there is almost no influence from the viewpoint of searching for a noise level.

In the case where the frequency sweep is performed in multiple stages as described above, a part of frequency bands in which a search modulation signal is frequency swept in the respective search modulation operation periods may overlap. FIG. 7 illustrates an example of a search modulation signal obtained by overlapping a part of frequency bands in which a frequency sweep is performed in two stages and a search reception signal received on the basis of the search modulation signal. In the example of FIG. 7, overlapping periods 604 and 605 in which frequency bands overlap each other are included in a search modulation operation period 601 in the first half and a search modulation operation period 603 in the second half. In this case, the search reception signal obtained in the overlapping period 604 and the search reception signal obtained in the overlapping period 605 theoretically have the same noise characteristics in a case where the surrounding environment does not change. Therefore, in the subsequent step S160 of FIG. 3, it suffices to obtain the noise level using either one of the search reception signals.

Note that although the example of the frequency sweep in two stages has been described in FIGS. 6 and 7; however, the frequency sweep may be performed in any number of stages more than two stages. Moreover, a frequency sweep may be performed discretely instead of the frequency sweep over the entire range between the minimum frequency Fmin and the maximum frequency Fmax. For example, a plurality of frequencies (or frequency bands) are set in advance between the minimum frequency Fmin and the maximum frequency Fmax, and the oscillator 105 is caused to generate a search modulation signal obtained by discrete frequency transmission at each of the frequencies (or frequency bands). This allows the search modulation operation period to be shortened.

Returning to the explanation of FIG. 3, in step S160, the signal processing unit 106 executes frequency search processing which is signal processing for searching for a frequency band having less interference through measurement of the surrounding radio wave interference state based on the digital data of the beat signal output from the reception unit 104 on the basis of the search reception signal received in the search modulation operation in step S150 and input to the signal processing unit 106. In the present embodiment, frequency search processing is performed according to the procedure illustrated in FIG. 8 using the search processing setting parameter initially set in step S110.

Figure 8:
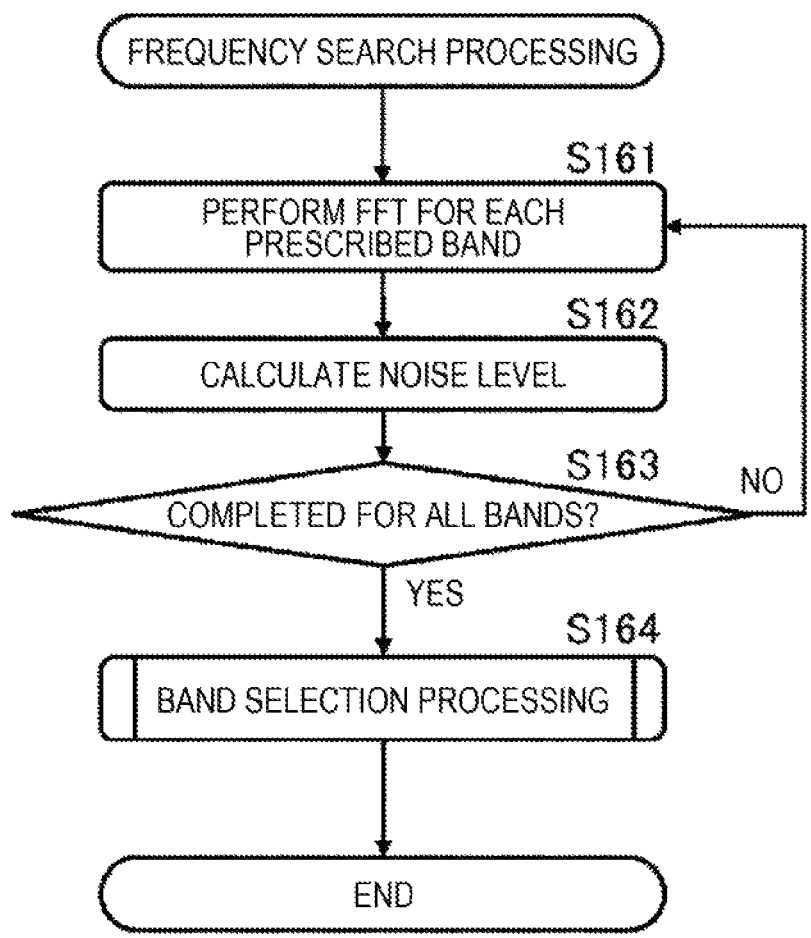
FIG. 8 is a flowchart of frequency search processing in the first embodiment of the present invention.

FIG. 8 is a flowchart of the frequency search processing performed by the signal processing unit 106 in step S160 of FIG. 3 in the first embodiment of the present invention. In step S161, the signal processing unit 106 causes the FFT processing unit 110 to perform FFT processing on the digital data of the beat signal input on the basis of the search reception signal for each prescribed frequency band. In this manner, spectrum information of the search reception signal for each prescribed frequency band is acquired. Subsequently, in step S162, the signal processing unit 106 causes the interference state analysis unit 113 to calculate the noise level for each prescribed frequency band on the basis of the spectrum information of the search reception signal obtained in step S161. In step S163, the signal processing unit 106 determines whether calculation of noise levels in all frequency bands available to the radar device 108 has been completed. If it is determined in the above result that the calculation of noise levels in all frequency bands has been completed, the flow proceeds to step S164, and if it is determined that there is a frequency band for which the noise level has not been calculated yet, the flow returns to step S161 to continue the frequency search processing. In step S164, the signal processing unit 106 causes the band selection unit 114 to perform band selection processing for selecting a frequency band of a transmission signal on the basis of the noise level of each of the frequency bands calculated in step S163. Note that details of the band selection processing will be described later with reference to FIG. 13. After execution of the band selection processing of step S164, the signal processing unit 106 completes the frequency search processing by completing the flowchart illustrated in FIG. 8.

Figure 9:
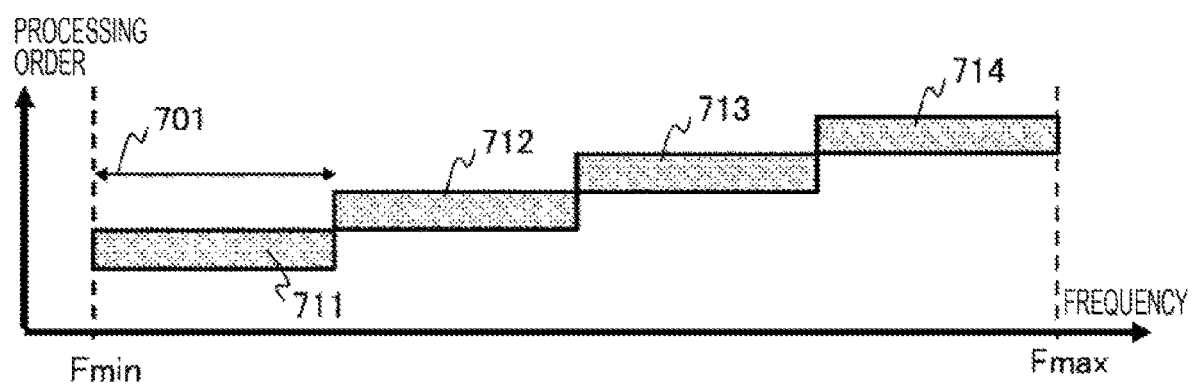
FIG. 9 is a graph illustrating an example of frequency bands of units of processing and a processing order in the frequency search processing.
Figure 10:
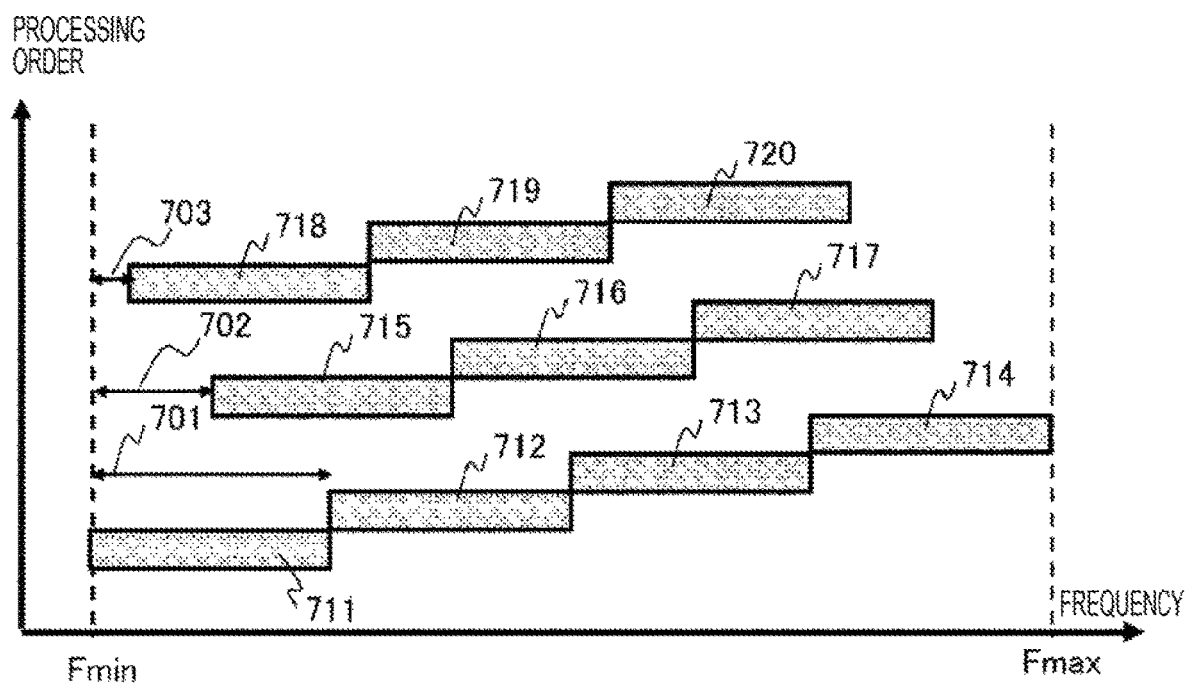
FIG. 10 is a graph illustrating an example of frequency bands of units of processing and a processing order in the frequency search processing.
Figure 11:
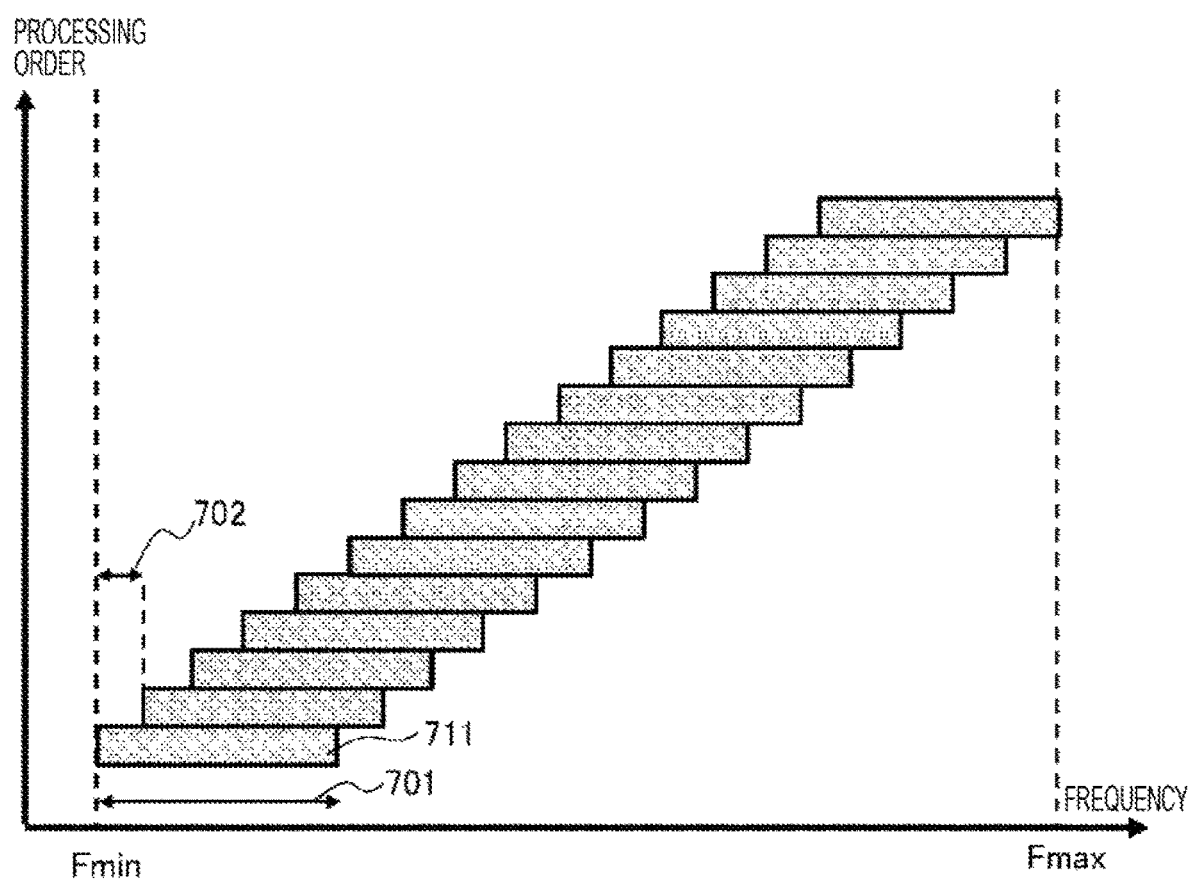
FIG. 11 is a graph illustrating an example of frequency bands of units of processing and a processing order in the frequency search processing.

FIGS. 9, 10 and 11 are graphs illustrating examples of frequency bands as units of processing in the frequency search processing illustrated in FIG. 8 and the processing order thereof. FIG. 9 illustrates that a range between the minimum frequency Fmin and the maximum frequency Fmax of the search reception signal is divided into four frequency bands 711, 712, 713, and 714 each having a frequency width 701 corresponding to the modulation width of the transmission signal and that FFT processing and noise level calculation are performed in time-series order using each of these frequency bands as a unit of processing in the frequency search processing. As a result, the noise level of the search reception signal is calculated for each of the frequency bands 711 to 714, and measurement of a radio wave interference state is performed. Note that the processing order of the frequency bands 711 to 714 is not limited to that illustrated in FIG. 9 and may be any order.

In a case where the signal processing unit 106 repeatedly executes the frequency search processing, a frequency band as a unit of processing may be changed for each processing. FIG. 10 illustrates an example in which a frequency band as a unit of processing in the frequency search processing is changed for each processing. In the example of FIG. 10, after the processing of the frequency bands 711 to 714 described in FIG. 9 is completed, frequency bands 715, 716, and 717 having the same frequency width 701 as that of the frequency bands 711 to 714 are set from the frequency, shifted from the minimum frequency Fmin by a prescribed offset frequency 702, as a starting point. Then, using these frequency bands as units of processing in the frequency search processing, FFT processing and noise level calculation are performed in time-series order. Note that the offset frequency 702 can be any value as long as the frequency width of the frequency bands 711 to 714 is not exceeded. By changing the frequency band as a unit of processing in the frequency search processing for each processing, the noise level of the search reception signal can be calculated in a finer range than in the case of FIG. 9, and thus the likelihood of finding a frequency band having less interference increases.

In the example of FIG. 10, after the processing of the frequency bands 715 to 717 is completed, frequency bands 718, 719, and 720 are further set from the frequency, shifted from the minimum frequency Fmin by an offset frequency 703 which is different from the above offset frequency 702, as a starting point. Then, using these frequency bands as units of processing in the frequency search processing, FFT processing and noise level calculation are performed in time-series order. By changing the offset frequency and executing the frequency search processing for each unit of processing multiple times, the noise level of the search reception signal can be calculated in finer ranges, which allows a frequency band with less interference to be found.

Alternatively, the noise level of the search reception signal may be calculated in fine ranges by allowing the frequency bands as units of processing in the frequency search processing to overlap. FIG. 11 illustrates an example in which frequency bands as units of processing in the frequency search processing overlap. In the example of FIG. 11, FFT processing and noise level calculation are performed in time-series order by allowing a plurality of frequency bands 711 to be each shifted by an offset frequency 702 and to overlap with each other in the range between the minimum frequency Fmin and the maximum frequency Fmax and using each of these frequency bands as a unit of processing in the frequency search processing.

This can also increase the likelihood of finding a frequency band with less interference.

Note that some of the setting methods of frequency bands as units of processing of in the frequency search processing described above may be used in combination. For example, after calculating noise levels of respective frequency bands in a rough range by the setting method described in FIG. 9, in a frequency range including a frequency band having the lowest noise level among these frequency bands, a noise level may be calculated by setting fine processing frequency bands as units of processing by the setting method described in FIG. 11. In this manner, a frequency band having less interference can be found more accurately.

Figure 12:
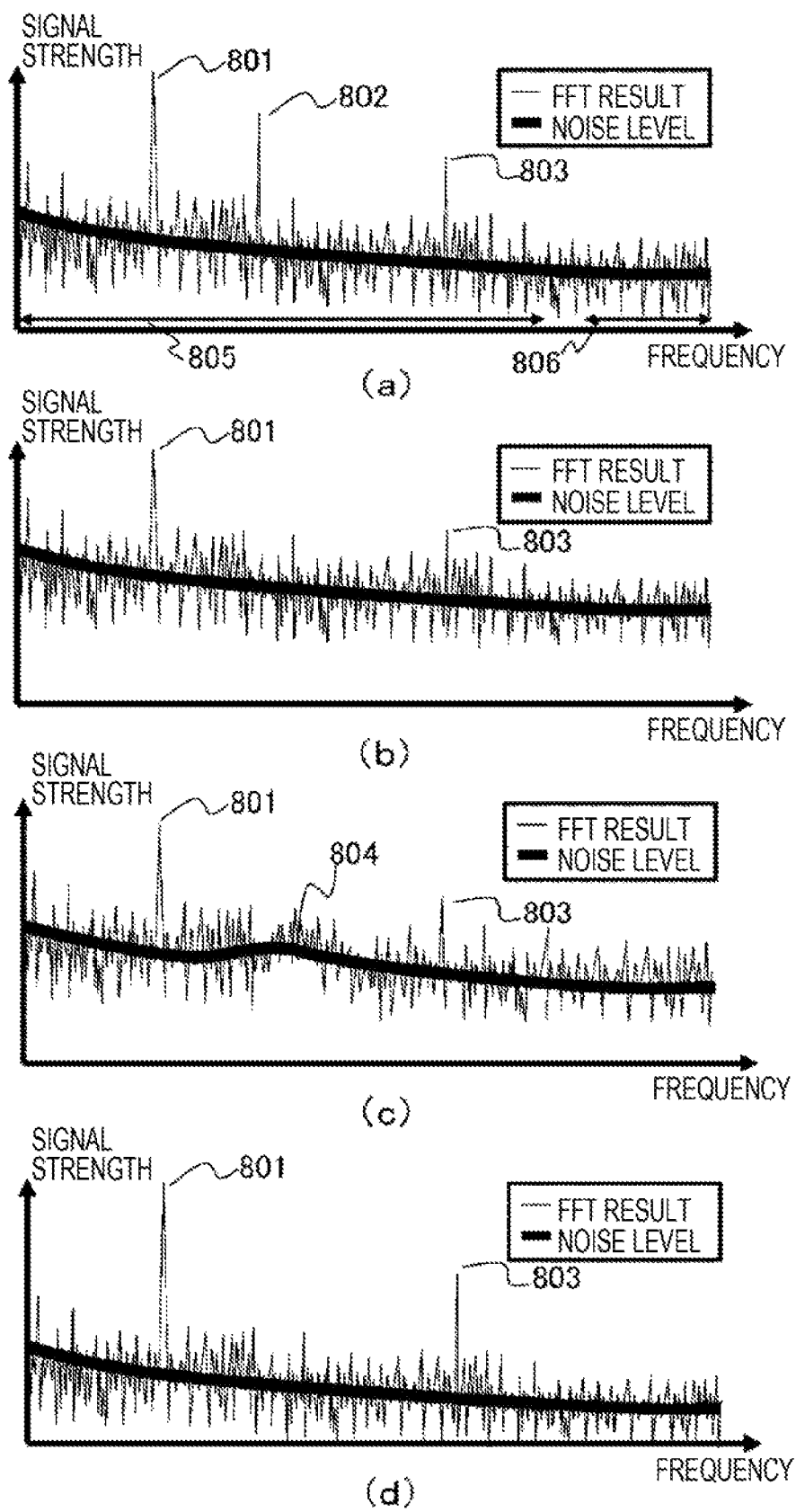
FIG. 12 includes graphs illustrating examples of an FFT processing result and a noise level of a search reception signal.

FIG. 12 includes graphs illustrating examples of an FFT processing result and a noise level of a search reception signal obtained using the frequency bands 711 to 714 described in FIGS. 9 and 10 as units of processing. In FIG. 12, the waveforms illustrated in (a), (b), (c), and (d) correspond to the frequency bands 711, 712, 713, and 714, respectively. In these waveforms, a thin line represents the spectrum of the search reception signal obtained from the FFT processing result, and a bold line represents the noise level calculated from the FFT processing result. Note that the calculation of the noise level is performed by calculating an average value or a moving average obtained by removing the peak from the spectrum of the search reception signal. Alternatively, a low and middle wave region 805 illustrated in FIG. 12(a) may be excluded from the calculation target in each of the spectrums of the frequency bands 711 to 714 in consideration of the influence of 1/f noise generated by various circuits in the radar device 108, and an average value of a high frequency region 806 may be calculated as the noise level.

In FIG. 12(a), peaks 801 to 803 are detected in the spectrum of the search reception signal. In FIG. 12(b), differences as compared with FIG. 12(a) are that the noise level has risen and that the peak 802 has disappeared. In addition, a rise portion 804 of the noise floor is identified in FIG. 12(c). In FIG. 12(d), the spectrum of the search reception signal has a similar tendency to that of FIG. 12(b); however, a difference is that the noise level is generally lower as compared with that in FIG. 12(b).

From the above results, it is determined that it is highly likely that the peak 802 in FIG. 12(a) is false detection due to an interference signal. The noise floor rise portion 804 in FIG. 12(c) is also considered to have generated by an interference signal. Although no clear influence by an interference signal is observed in FIG. 12(b), it is likely that there is some influence by an interference signal since the noise level is generally high as compared to the FFT results in other frequency bands. Therefore, it is determined in the frequency search processing that the frequency band 714, in which the waveform of FIG. 12(d) has been acquired, has the least interference among the frequency bands 711, 712, 713, and 714 of FIGS. 9 and 10.

Figure 13:
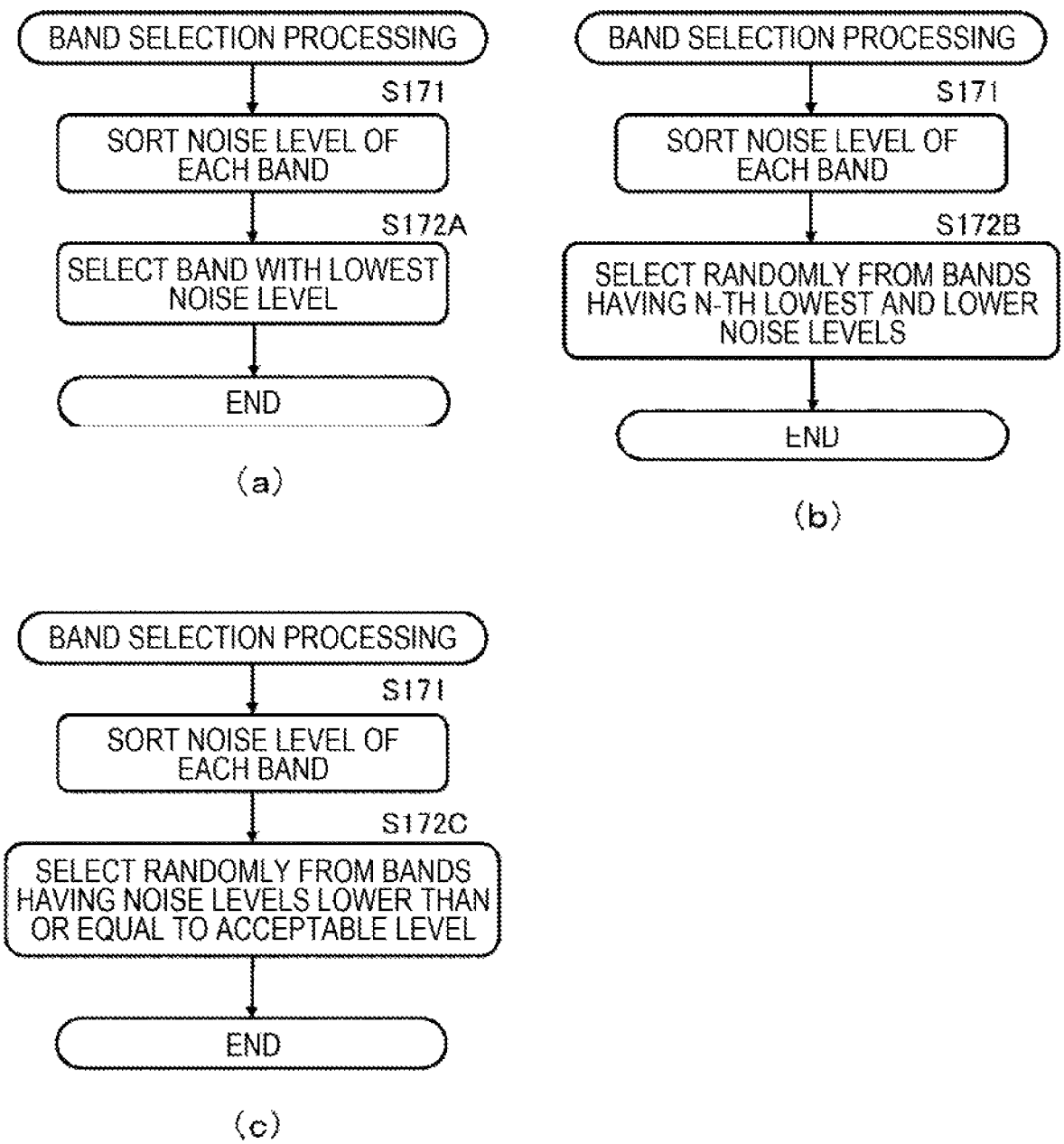
FIG. 13 includes flowcharts of band selection processing.

FIG. 13 includes flowcharts of band selection processing executed in step S164 of FIG. 8. The band selection unit 114 can select a frequency band of a transmission signal by executing, for example, one of the flowcharts illustrated in FIGS. 13(a), 13(b), and 13(c) on the basis of the noise levels of the respective frequency bands calculated in step S163 as the band selection processing.

In the flowchart of FIG. 13(a), the noise levels of the respective frequency bands calculated in step S163 are sorted in the order of magnitude in step S171. In step S172A, a frequency band with the lowest noise level sorted in step S171, that is, a frequency band with the least interference, is selected as the frequency band of the transmission signal in the next frame.

After the frequency band is selected in step S172A, the selection result is temporarily stored in the signal processing unit 106, and the band selection processing is completed.

In the flowchart of FIG. 13(b), the noise levels of the respective frequency bands calculated in step S163 are sorted in the order of magnitude in step S171. In step S172B, any one of frequency bands up to an N-th (N is any natural number larger than or equal to 2) place in ascending order of noise levels sorted in step S171 is selected as the frequency band of the transmission signal in the next frame. After the frequency band is selected in step S172B, the selection result is temporarily stored in the signal processing unit 106, and the band selection processing is completed.

In the flowchart of FIG. 13(c), the noise levels of the respective frequency bands calculated in step S163 are sorted in the order of magnitude in step S171. In step S172C, any one of frequency bands having a noise level at a prescribed acceptable level or lower levels sorted in step S171 is selected as the frequency band of the transmission signal in the next frame. After the frequency band is selected in step S172C, the selection result is temporarily stored in the signal processing unit 106, and the band selection processing is completed.

Note that methods other than the respective processing of FIGS. 13(a) to 13(c) described above can be adopted in the band selection processing. As long as a frequency band can be appropriately selected as the frequency band of the transmission signal on the basis of the noise level for each frequency band obtained by FFT processing on the search reception signal, band selection processing may be performed by any method.

Returning to the explanation of FIG. 3, in step S170, the signal processing unit 106 determines whether the frequency band of the transmission signal determined by the frequency search processing of step S160, that is, the result of the band selection processing in step S164 of FIG. 8 is different from the frequency band currently in use. If they are different, the flow proceeds to step S180. If they are the same, the flow proceeds to step S190 without executing step S180.

In step S180, the signal processing unit 106 changes the setting of the frequency band of the transmission signal of the next frame. In this example, by changing the modulation setting parameter depending on the frequency of the transmission signal selected in the frequency search processing of step S160, the frequency of the modulation signal generated by the oscillator 105 is allow to change when the processing of step S120 is executed again.

In step S190, the signal processing unit 106 determines whether the operation of the radar device 108 is completed. If the radar device 108 is in operation, the flow returns to step S120, and the above processing is repeated. At this time, if setting of the frequency band is changed in step S180 which has been performed immediately before, a transmission signal modulated in the frequency band after the change is emitted in step S120. On the other hand, if the operation of the radar device 108 is completed, the signal processing unit 106 terminates the processing illustrated in the flowchart of FIG. 3 and stops.

Figure 14:
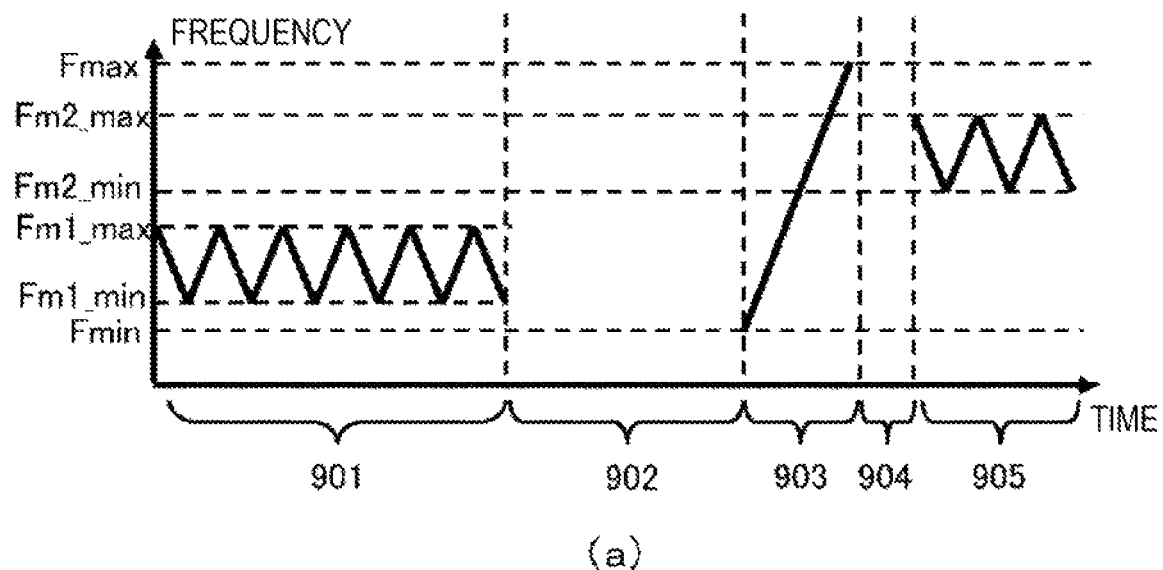
FIG. 14 includes graphs explaining the overall operation of the radar device.
Figure 14:
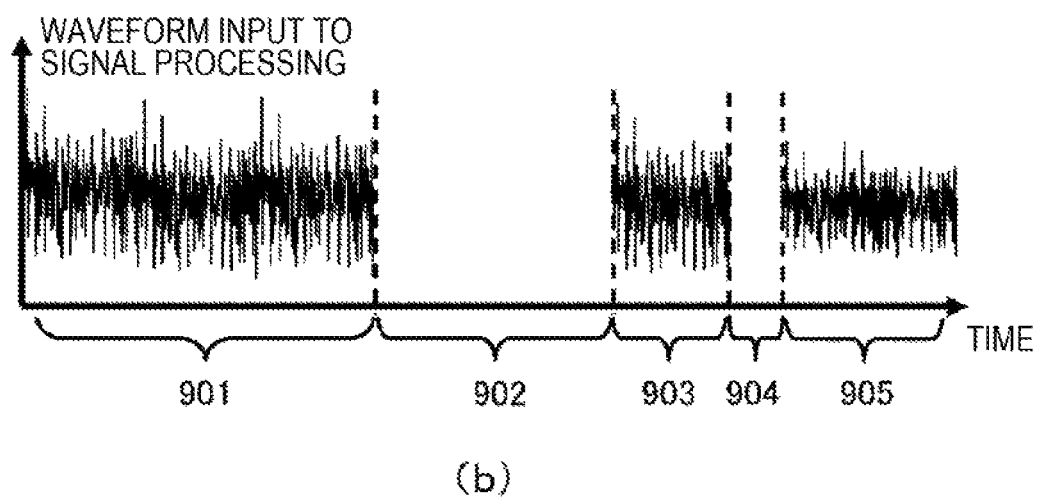

FIG. 14 includes graphs explaining the overall operation of the radar device 108 by the above-described processing. FIG. 14(a) illustrates an example of frequency changes of a modulation signal generated by the oscillator 105, and FIG. 14(b) illustrates an example of a reception signal waveform input from the reception unit 104 to the signal processing unit 106. In FIG. 14, the modulation signal continuously changes between a frequency Fm1_min and a frequency Fm1_max by FMCW modulation in a modulation operation period 901, and a reception signal with relatively high noise is obtained. In a subsequent signal processing period 902, no modulation signal is output, and thus no reception signal is obtained. In a subsequent search modulation operation period 903, a modulation signal which continuously changes from the frequency Fmin to the frequency Fmax is output as a search modulation signal over the entire frequency bands available to the radar device 108, and a search reception signal corresponding thereto is input. Thereafter, the above-described processing is performed in a frequency search processing period 904 on the basis of the search reception signal obtained in the search modulation operation period 903, and a frequency band with less interference is thereby selected. As a result, in a subsequent modulation operation period 905 the modulation signal changes continuously between a frequency Fm2_min and a frequency Fm2_max, which are different from the frequency bands in the previous modulation operation period 901, and a reception signal with suppressed noise is obtained.

According to the first embodiment of the present invention described above, the following operational effects are obtained.

(1) The radar device 108 includes: the oscillator 105 which generates a frequency-modulated modulation signal; the transmission unit 103 which emits a transmission signal frequency-modulation during a prescribed modulation operation period using the modulation signal generated by the oscillator 105; the reception unit 104 which receives a reception signal which is the transmission signal reflected by a surrounding object; and the signal processing unit 106. The signal processing unit 106 includes: the object information calculation unit 112 which calculates information of the object on the basis of the reception signal; the interference state analysis unit 113 which measures a surrounding radio wave interference state in a range between a prescribed minimum frequency Fmin to a maximum frequency Fmax during a search modulation operation period that does not overlap with the modulation operation period; and the band selection unit 114 which selects a frequency band of a transmission signal on the basis of the radio wave interference state measured by the interference state analysis unit 113. With this arrangement, stable operation of the radar device 108 can be implemented even when there is radio wave interference among a large number of radar devices.

(2) The radar device 108 further includes the search modulation control unit 115 which causes the oscillator 105 to generate a search modulation signal obtained by a frequency sweep between the minimum frequency Fmin and the maximum frequency Fmax during a search modulation operation period. The interference state analysis unit 113 measures a radio wave interference state on the basis of a search reception signal received by the reception unit 104 using the search modulation signal. Specifically, the noise level of the search reception signal is measured for each of a plurality of frequency bands having a prescribed frequency width between the minimum frequency Fmin and the maximum frequency Fmax (steps S161 and S162 in FIG. 8). The band selection unit 114 selects a frequency band of a transmission signal on the basis of the measurement result of the noise level by the interference state analysis unit 113 (step S164). With this arrangement, the interference state analysis unit 113 can measure the radio wave interference state by using the oscillator 105 that generates a modulation signal for generating a transmission signal.

(3) The band selection unit 114 can select a frequency band having the lowest noise level among the plurality of frequency bands as the frequency band of the transmission signal (FIG. 13(a)). Alternatively, any one of the plurality of frequency bands can be selected as the frequency band of the transmission signal in a prescribed order in an ascending order of the noise level (FIG. 13(b)). Alternatively, any one of the plurality of frequency bands having the noise level at a prescribed acceptable level or a lower level may be selected as the frequency band of the transmission signal (FIG. 13(c)). Adopting any of the above allows a frequency band with relatively low interference to be selected as the frequency band of the transmission signal.

(4) As described with reference to FIG. 10, the interference state analysis unit 113 may execute, in time series, first analysis processing of calculating the noise level for each of the plurality of frequency bands 711 to 714 set from the prescribed minimum frequency Fmin as a starting point and second analysis processing of calculating the noise level for each of the plurality of frequency bands 715 to 717 set from the frequency, obtained by adding the prescribed offset frequency 702 to the minimum frequency Fmin, as a starting point. This can increase the likelihood of finding a frequency band with less interference.

(5) The interference state analysis unit 113 may execute the second analysis processing described above multiple times by further changing the offset frequency 702 to obtain the offset frequency 703 and calculating the noise level for each of the plurality of frequency bands 718 to 720 set from the frequency, obtained by adding this offset frequency 703 to the minimum frequency Fmin, as a starting point. This can further increase the likelihood of finding a frequency band with less interference.

(6) Alternatively, as described in FIG. 11, the interference state analysis unit 113 may cause two frequency bands 711 adjacent to each other among the plurality of frequency bands 711, for which the noise level is to be calculated, to overlap at least partially. This can also increase the likelihood of finding a frequency band with less interference.

(7) The search modulation control unit 115 can cause the oscillator 105 to generate a search modulation signal obtained by a continuous frequency sweep between the minimum frequency Fmin and the maximum frequency Fmax as described in FIG. 5. Alternatively, as described in FIG. 6 and FIG. 7, the range between the minimum frequency Fmin and the maximum frequency Fmax may be divided into a plurality of frequency bands, and the oscillator 105 may be caused to generate a search modulation signal obtained by a frequency sweep of each of the divided frequency bands. Alternatively, the oscillator 105 may be caused to generate a search modulation signal obtained by a discrete frequency sweep at each of a plurality of frequencies preset between the minimum frequency Fmin and the maximum frequency Fmax. Adopting any of the above allows a search modulation signal obtained by a frequency sweep within a desired search modulation operation period to be obtained in consideration of constraints due to the performance of the oscillator 105 and the like.

Second Embodiment

Next, a second embodiment of the present invention will be described. In this embodiment, an example in which frequency search processing is performed in a procedure different from that described in the first embodiment will be described. Note that the configuration of a radar device 108 and the functional configuration of a signal processing unit 106 in the present embodiment as well as the overall processing flow of the signal processing unit 106 described in FIG. 3 are similar to those of the first embodiment, and thus description thereof is omitted, and only differences in the frequency search processing are explained.

Figure 15:
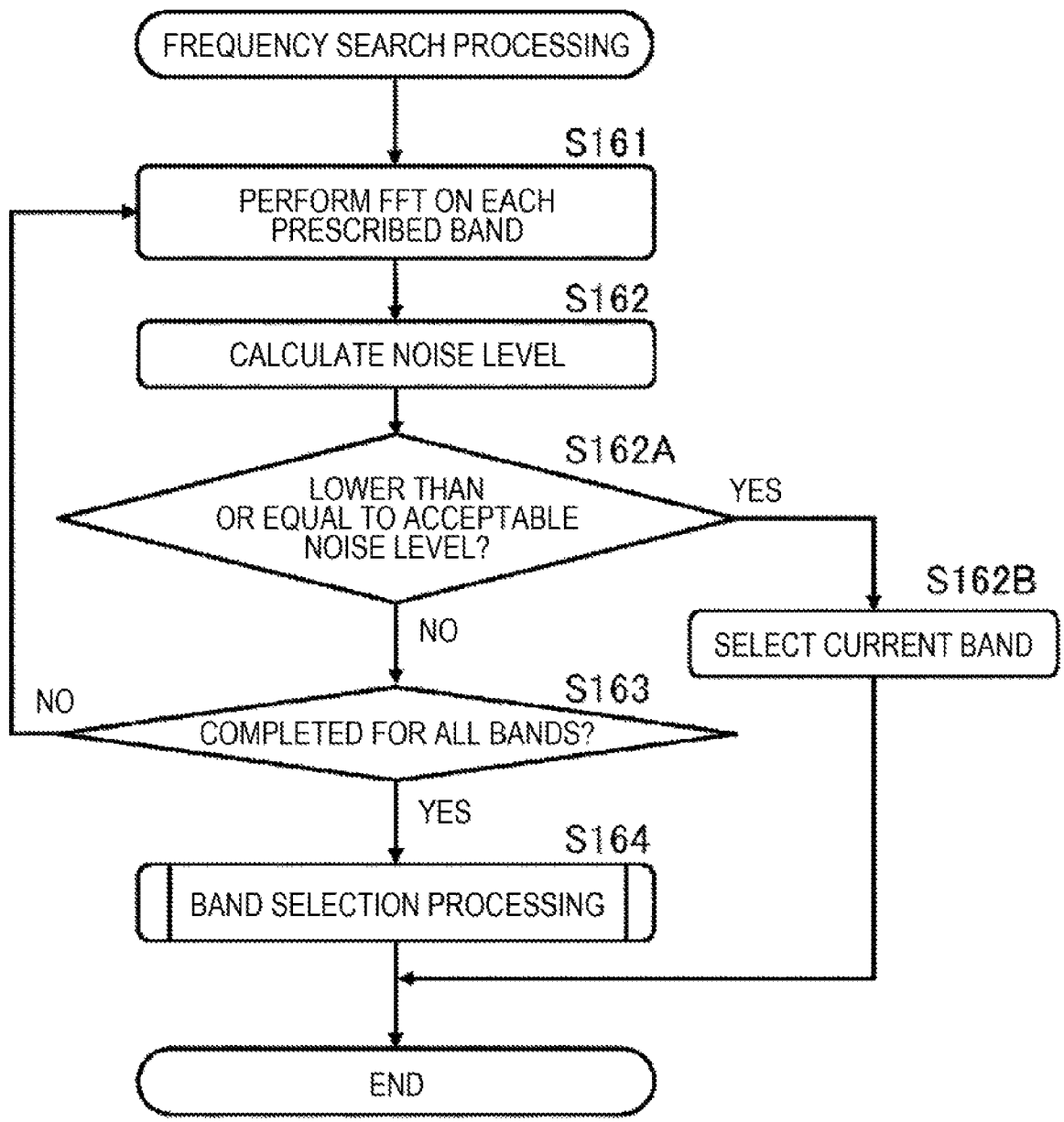
FIG. 15 is a flowchart of frequency search processing in a second embodiment of the present invention.

FIG. 15 is a flowchart of frequency search processing performed by the signal processing unit 106 in step S160 of FIG. 3 in the second embodiment of the present invention. The present embodiment differs from the first embodiment described in FIG. 8 in that the processing of steps S162A and S162B is performed after step S162.

In step S162A, the signal processing unit 106 determines whether a noise level calculated in step S162 is lower than or equal to a prescribed acceptable level. This acceptable level may be the same as or different from the acceptable level in step S172C of FIG. 13(c) described in the first embodiment. If the noise level is lower than or equal to the acceptable level in the above result, the flow proceeds to step S162B, and a band selection unit 114 selects the frequency band for which the noise level has been calculated as the frequency band of the transmission signal in the next frame. After the frequency band is selected in step S162B, the selection result is temporarily stored in a signal processing unit 106, and the band selection processing is completed. On the other hand, if the noise level is larger than the acceptable level, the flow proceeds to step S163, and similar processing to that described in the first embodiment is performed.

Note that, in a case where band selection processing of step S164 is performed in the present embodiment, it is preferable that the band selection processing is performed in accordance with the flowchart of FIG. 13(a) or 13(b) out of the flowcharts of FIGS. 13(a), 13(b), and 13(c) described in the first embodiment. That is, the band selection processing of step S164 is performed in the present embodiment when the noise level is larger than the acceptable level in all frequency bands. Therefore, in order to select a frequency band with a noise level as low as possible, it is preferable to perform the band selection processing according to the flowchart of FIG. 13(a) or 13(b).

In addition, when FFT processing is performed for each frequency band in step S161 in the present embodiment, it is preferable to first perform FFT processing for the frequency band of the current transmission signal. That is, in the present embodiment, in a case where the noise level of a certain frequency band is lower than or equal to the acceptable level, the current frequency band is selected as the frequency band of the transmission signal without measurement of the noise level of other frequency bands. Therefore, by performing FFT processing from the frequency band of the current transmission signal to measure the noise level, the frequency band can be continuously selected when no interference is occurring in the frequency band of the current transmission signal.

According to the second embodiment of the present invention described above, if there is a frequency band having the noise level lower than or equal to the prescribed acceptable level among the plurality of frequency bands (step S162A: Yes), the band selection unit 114 selects that frequency band as the frequency band of the transmission signal (step S162B). On the other hand, if there is no frequency band having the noise level lower than or equal to the acceptable level (step S163: No), a frequency band having the lowest noise level is selected as the frequency band of the transmission signal, or any frequency band is selected as the frequency band of the transmission signal in a prescribed order in an ascending order of the noise level (step S164). With this arrangement, it is possible to select a frequency band with relatively low interference as the frequency band of a transmission signal without measurement of noise levels of all bands.

Note that, in the first and second embodiments described above, the case where the number of reception channels of the radar device 108 is one has been described as an example; however, the present invention is also applicable to a case where the radar device 108 has a plurality of reception channels. In this case, the above processing may be performed for all reception channels. Alternatively, one or a plurality of representative channels may be set in advance to reduce the processing amount, and a selected frequency band of a transmission signal may be applied to other reception channels by performing the above processing on the representative channel(s).

In the first and second embodiments, the example in which the search modulation operation and the frequency search processing are performed every time in steps S150 and S160 of FIG. 3 has been described; however, the above processing may not necessarily be performed every time. For example, the flowchart may be modified such that the noise level of the reception signal in the current frequency band is calculated in the signal processing of step S130 and that the flow transits to the next frame without executing the operation of step S150 and subsequent steps if the calculated value is lower than or equal to the prescribed acceptable value. Alternatively, the above processing may be performed at any frequency for every several frames without performing the search modulation operation nor the frequency search processing each time.

Moreover, in the first and second embodiments the example has been described in which the noise level of each frequency band measured by the radar device 108 in the frequency search processing is used to select the frequency band of the transmission signal in the next frame; however, the noise level for each frequency band measured by the radar device may be used for other applications. For example, the noise level for each frequency band may be transmitted from the radar device to the vehicle control device to be used for vehicle control or the like performed in the vehicle control device. Furthermore, another device connected to the radar device may select the frequency band of the transmission signal in the next frame on the basis of the noise level for each frequency band measured by the radar device and notify the radar device of the selection result.

The above-described embodiments and various variations are merely examples, and the present invention is not limited to these contents as long as the features of the invention are not impaired. Although various embodiments and variations have been described above, the present invention is not limited to these contents. Other aspects conceivable within the scope of technical ideas of the present invention are also included within the scope of the present invention.

REFERENCE SIGNS LIST 101 transmission antenna
102 reception antenna
103 transmission unit
104 reception unit
105 oscillator
106 signal processing unit
107 communication interface
108 radar device
109 vehicle control device
110 FFT processing unit
111 demultiplexer
112 object information calculation unit
113 interference state analysis unit
114 band selection unit 114
115 search modulation control unit

The invention claimed is:

1. A radar device, comprising:
an oscillation unit which generates a frequency-modulated modulation signal;
a transmission unit which emits a transmission signal frequency-modulated during a prescribed modulation operation period using the modulation signal;
a reception unit which receives a reception signal which is the transmission signal reflected by a surrounding object;
an object information calculation unit which calculates information of the object on the basis of the reception signal;
an interference state analysis unit which measures a surrounding radio wave interference state in a range between a prescribed minimum frequency and a maximum frequency during a search modulation operation period which does not overlap with the modulation operation period; and
a band selection unit which selects a frequency band of the transmission signal on the basis of the radio wave interference state measured by the interference state analysis unit.

2. The radar device according to claim 1, further comprising:
a search modulation control unit which causes the oscillation unit to generate a search modulation signal obtained by a frequency sweep between the minimum frequency and the maximum frequency during the search modulation operation period,
wherein the interference state analysis unit measures the radio wave interference state on the basis of a search reception signal received by the reception unit using the search modulation signal.

3. The radar device according to claim 2,
wherein the interference state analysis unit measures a noise level of the search reception signal for each of a plurality of frequency bands having a prescribed frequency width between the minimum frequency and the maximum frequency, and
the band selection unit selects a frequency band of the transmission signal on the basis of the measurement result of the noise level by the interference state analysis unit.

4. The radar device according to claim 3,
wherein the band selection unit selects a frequency band having a lowest noise level among the plurality of frequency bands, as the frequency band of the transmission signal.

5. The radar device according to claim 3,
wherein the band selection unit selects any one of the plurality of frequency bands as the frequency band of the transmission signal in a prescribed order in an ascending order of the noise level.

6. The radar device according to claim 3,
wherein the band selection unit selects any one of the plurality of frequency bands having the noise level at a prescribed acceptable level or a lower level, as the frequency band of the transmission signal.

7. The radar device according to claim 3,
wherein in a case where there is a frequency band having the noise level at a prescribed acceptable level or a lower level among the plurality of frequency bands, the band selection unit selects this frequency band as the frequency band of the transmission signal, and in a case where there is no frequency band having the noise level at the acceptable level or a lower level, the band selection unit selects a frequency band having a lowest noise level or selects any one of the frequency bands in a prescribed order in an ascending order of the noise level as the frequency band of the transmission signal.

8. The radar device according to claim 3,
wherein the interference state analysis unit executes, in time series, first analysis processing of calculating the noise level for each of a plurality of first frequency bands set from a prescribed first frequency as a starting point and second analysis processing of calculating the noise level for each of a plurality of second frequency bands set from a second frequency, which is obtained by adding a prescribed offset frequency to the first frequency, as a starting point.

9. The radar device according to claim 8,
wherein the interference state analysis unit executes the second analysis processing a plurality of times by changing the offset frequency.

10. The radar device according to claim 3,
wherein two frequency bands adjacent to each other among the plurality of frequency bands overlap at least partially.

11. The radar device according to claim 2,
wherein the search modulation control unit causes the oscillation unit to generate the search modulation signal obtained by a continuous frequency sweep between the minimum frequency and the maximum frequency.

12. The radar device according to claim 2,
wherein the search modulation control unit divides the range between the minimum frequency and the maximum frequency into a plurality of frequency bands and causes the oscillation unit to generate the search modulation signal obtained by a frequency sweep of each of the divided frequency bands.

13. The radar device according to claim 2,
wherein the search modulation control unit causes the oscillation unit to generate the search modulation signal obtained by a discrete frequency sweep of each of a plurality of frequencies preset in the range between the minimum frequency and the maximum frequency.

* * * * *